United States Patent
Oksman (10) Patent No.: US 10,142,216 B2
(45) Date of Patent: Nov. 27, 2018

(54) POWER SAVING IN COMMUNICATION SYSTEMS

(71) Applicant: Lantiq Deutschland GmbH, Neubiberg (DE)

(72) Inventor: Vladimir Oksman, Morganville, NJ (US)

(73) Assignee: Lantiq Deutschland GmbH, Neubiberg (DE)

( * ) Notice: Subject to any disclaimer, the term of this patent is extended or adjusted under 35 U.S.C. 154(b) by 0 days.

(21) Appl. No.: 14/915,279

(22) PCT Filed: Aug. 28, 2014

(86) PCT No.: PCT/EP2014/068247
§ 371 (c)(1),
(2) Date: Feb. 29, 2016

(87) PCT Pub. No.: WO2015/028545
PCT Pub. Date: Mar. 5, 2015

(65) Prior Publication Data
US 2016/0212036 A1    Jul. 21, 2016

Related U.S. Application Data

(60) Provisional application No. 61/871,850, filed on Aug. 29, 2013.

(51) Int. Cl.
*H04L 25/02* (2006.01)
*H04L 12/26* (2006.01)
(Continued)

(52) U.S. Cl.
CPC ............ *H04L 43/16* (2013.01); *H04B 3/32* (2013.01); *H04L 1/0025* (2013.01);
(Continued)

(58) Field of Classification Search
CPC ... H04L 43/16; H04L 2012/6478; H04B 3/32; H04M 11/062; Y02D 50/44
See application file for complete search history.

(56) References Cited

U.S. PATENT DOCUMENTS

2002/0181439 A1* 12/2002 Orihashi ............... H04J 3/0605
370/350
2005/0271129 A1* 12/2005 Reina .................... H04L 1/0025
375/222

(Continued)

FOREIGN PATENT DOCUMENTS

WO    WO 2013029671 A1 *  3/2013   ............... H04B 3/32

OTHER PUBLICATIONS

Associate Rapporteur for G Fast: "G.fast: Updated Issues List for G.fast; TD2013-07-Q4-U20", ITU-T Draft; Study Period 2013-2016, International Telecommunication Union, Geneva; CH, vol. 4/15, Jul. 1, 2013, pp. 1-52, XP044006354.

(Continued)

*Primary Examiner* — Syed Haider
(74) *Attorney, Agent, or Firm* — Eschweiler & Potashnik, LLC (57) ABSTRACT

Devices and methods are provided utilizing a low power mode. In some cases, bit loading required to provide a needed bit rate may be calculated by a receiver and sent to a transmitter. In some embodiments, a number of tones used for synchronization symbols may be higher than a number of tones used for data symbols in a low power mode. Other techniques are also presented.

17 Claims, 6 Drawing Sheets

(51) Int. Cl.
    *H04B 3/32*       (2006.01)
    *H04M 11/06*    (2006.01)
    *H04L 1/00*       (2006.01)
    *H04L 7/00*       (2006.01)
    *H04L 7/04*       (2006.01)
    *H04L 12/64*     (2006.01)

(52) U.S. Cl.
    CPC .............. *H04L 7/0091* (2013.01); *H04L 7/04* (2013.01); *H04L 25/0202* (2013.01); *H04M 11/062* (2013.01); *H04L 2012/6478* (2013.01); *Y02D 50/44* (2018.01)

(56) References Cited

U.S. PATENT DOCUMENTS

2006/0188035 A1* 8/2006 Tzannes ................ H04L 1/0002
                                              375/260

2007/0127362 A1* 6/2007 Bune ...................... H04L 5/0048
                                              370/208

2007/0248181 A1* 10/2007 Clausen ................. H04B 15/02
                                              375/285

2010/0254444 A1* 10/2010 Clausen ................ H04L 5/0042
                                              375/220

2010/0303136 A1* 12/2010 Ashikhmin .............. H04B 3/32
                                              375/222

2011/0170587 A1* 7/2011 Kim ................... H04L 25/0204
                                              375/232

2012/0026926 A1* 2/2012 Frenzel .................... H04B 3/32
                                              370/311

OTHER PUBLICATIONS

International Search Report with Written Opinion of PCT/EP2014/068247, dated Mar. 12, 2014.

* cited by examiner

——▶ Line activation
---- ▶ Line deactivation (orderly or disorderly)
—·—·▶ Traffic driven LPM transitions
············▶ Transitions to and from battery feeding (mains failure and recovery)

POWER SAVING IN COMMUNICATION SYSTEMS

CROSS-REFERENCE TO RELATED APPLICATIONS

This application is a national stage entry of PCT/EP2014/068247 having an international application date of Aug. 28, 2014, which application claims priority of U.S. Application Ser. No. 61/871,850, filed Aug. 29, 2013, entitled, "Method of power saving in vectored DSL system deployed from a cabinet or a distribution point". The entire disclosure of the prior application is considered part of the disclosure of this application and is hereby incorporated by reference.

TECHNICAL FIELD

The present application relates to power saving in communication systems.

BACKGROUND

Digital subscriber line (DSL) technology is a technology which is frequently employed nowadays to deliver broadband services to customers. Various variations and implementations of DSL have been developed, for example ADSL, ADSL2, VDSL, VDSL2, etc. up to G.fast currently under development. All these variants will be generically referred to as DSL herein. DSL technology, during all its history, attempted to increase a bit rate so that more broadband services may be delivered to customers. Previously, wire lines like copper loops (for example from conventional telephone systems) deployed from a central office (CO) to customer premises (CPE) were employed which were rather long and did not allow transmission of data with bit rates more than a few Mb/s (megabits per second). To increase bit rates available to customers, modern access networks use street cabinets, multi-dwelling-unit (MDU) cabinets and similar arrangements which are installed close to customer premises. Such a cabinet may for example be connected to the central office by a high-speed fiber communication line, for example a gigabit passive optical network (GPON). From these cabinets, high-speed DSL systems such as Very-High-Bit-Rate DSL (VDSL2) provide connection to the customer premises.

Currently deployed VDSL2 systems (as defined e.g. in ITU-T Recommendation G.993.2) have a range of operation of about 1 km, providing bit rates in the range of tens of Mb/s. To increase the bit rate of VDSL2 systems deployed from the cabinet, recent ITU-T Recommendation G.993.5 defined vectored transmission that allows increasing upstream and downstream bit rates up to 100 Mb/s. A majority of VDSL2 systems are now deployed from cabinets and upgraded to implement vectoring operation based on G.993.5. G.fast, which is currently under development, aims at even higher bit rates and may also employ vectoring.

Power consumption is one of the key issues for cabinet deployments. Since most of DSL lines are always on, they consume power all the time, regardless whether the customer is using a service or not. In the aim to reduce the power consumption, an efficient technique of power reduction would be desirable to reduce transmit power during the time when the line is not used actively or used with reduced bit rate. For example, it would be desirable to reduce power consumption during a time the system operates with reduced bit rate (like VoiP service only) or is in sleeping mode, when only "keep alive" signals are rarely exchanged between CO and CPE.

One conventional way to reduce power is to simply switch the modem off, and customers are welcomed to do that. However, most of them do not do that, e.g. keeping the line on even at night time to avoid long waiting time for DSL startup (for vectored VDSL2 it may last up to 60-90 seconds). By the same reason it is hardly possible to save power this way in shorter breaks in data transmission during the day. Another reason is that in vectored DSL leaving (e.g. when switching off) and joining (e.g. when switching on again) of a line to a vectored group may require some adjustments in other lines, which may impact performance of existing services.

Another way is to apply a so called "low power mode" currently used in ADSL2 and also proposed for VDSL2 at some point. With ADSL low power mode, a modem monitors the incoming data traffic and turns into low transmit power and low bit loading when the required bit rate drops substantially. When the service bit rate is back at high values, the modem exits low power mode and returns to normal operation. This method is rather efficient, because the power consumption of the modem significantly depends on the value of the transmit power.

To avoid loss of data (keep the process seamless), the exit from low power mode shall be very fast; otherwise the incoming data will overflow the buffer and get lost.

One disadvantage of an L2 low power module conventionally used in ADSL is non-stationary behavior of the line. When a line going to L2, the crosstalk this line generates into other lines decreases and other lines may take an advantage of this crosstalk reduction to increase their bit rates. When the line is quickly turning back into normal operation, the crosstalk generated by this line suddenly increase, which can significantly reduce performance of other lines and even kick them out of synchronization. Thus, low power mode may cause an unstable connection.

Another problem when the modem gets back in to full power is that the tones, i.e. carrier frequencies, that were turned off during low power mode may not have a necessary minimum SNR when they come back. To avoid a communication failure, a modem in low power mode may need to monitor the line condition also for carriers that are not used. This monitoring is implemented by returning into full power mode from time to time, measure the actual SNR, and update bit loading tables to be used when modem will transition back into full power mode. This causes additional non-stationary noise which may cause unacceptable performance reduction in other operating lines.

Other conventional approaches use a predetermined set of tones that are transmitted with no change in power both in low power mode and in full power mode. However, such approaches may be problematic as regards support of vectoring, may limit power saving and/or may cause problems when the tones which are transmitted in low power mode are not usable for example due to crosstalk, narrow band interference or a notch in a loop transfer function due to a bridge tap.

DETAILED DESCRIPTION

In the following, various embodiments will be described in detail referring to the attached drawings. The embodiments shown and described are to be regarded as illustrative examples only and are not to be construed as limiting. For example, while embodiments may be described as comprising a plurality of features or elements, in other embodiments some of these features or elements may be omitted and/or replaced by alternative features or elements. In yet other embodiments, additional features or elements may be provided. Features or elements from different embodiments may be combined to form further embodiments.

Any connections or couplings shown in the drawings or described herein may be implemented as direct connections or couplings, i.e. connections or couplings without intervening elements, or indirect connections or couplings, i.e. connections or couplings with one or more intervening elements, as long as the general purpose of the connection or coupling, for example to transmit a certain kind of signal and/or to transmit a certain kind of information, is essentially maintained. Connections or couplings may be wire-based connections or couplings or may also be wireless connections or couplings unless noted otherwise.

In the following, DSL systems and devices will be used as illustrative embodiments. This does not imply that the techniques disclosed herein may also be applicable to other kinds of communication systems or techniques, for example other wire-based or wireless techniques. For embodiments which are described using DSL as an example, terminology used is intended to have the meaning as used in the art of DSL, for example as defined in various DSL standards. DSL may refer to any flavor or variation of DSL, like ADSL, ADSL2, VDSL, VDSL2 or the emerging G.fast.

In some embodiments, a low power mode for association with at least a transmitter or a receiver may be identified. The low power mode may be communicated, and a bit loading and tone associated information may be received. In some embodiments, additionally a symbol position to indicate when the low power mode will commence may be communicated.

In some embodiments, to leave a low power mode an exit flag, also referred to as exit sequence, may be transmitted.

In some embodiments, during a low power mode more power and/or more tones may be used for synchronization symbols than for data symbols. In some embodiments, synchronization symbols may be used for channel estimation, for example to track crosstalk, during low power mode. In some embodiments, this may avoid or mitigate problems regarding crosstalk when leaving the low power mode.

In embodiments, a method of power saving that provides reduced power for low bit rate services may be provided. The transition for normal bit rate and low bit rate during low power mode may be seamless.

Embodiments provide vectoring capabilities during low power mode that may be used for both direct channel estimation and FEXT (far end crosstalk) channel estimation. Thus, in embodiments the modem in low power mode may not need to keep transmitting unnecessary subcarriers to maintain updated SNR for normal operation, and/or does not produce non-stationary noise. Only few subcarriers necessary for data transmission may be turned on, which may allow substantial power reduction, while sync symbols used for channel estimation and monitoring may be transmitted rather rare and do not impact power savings in embodiments. Further, for very low bit rates, embodiments may exclude from transmission also a majority of symbols, allowing only a minimum number that is necessary to carry the data. These active symbols may be sent on few dedicated positions, which may allow a receiver to identify the active symbols with no additional management communications between the CO and the CPE.

Further embodiments will now be described referring to the attached drawings.

Figure 1:
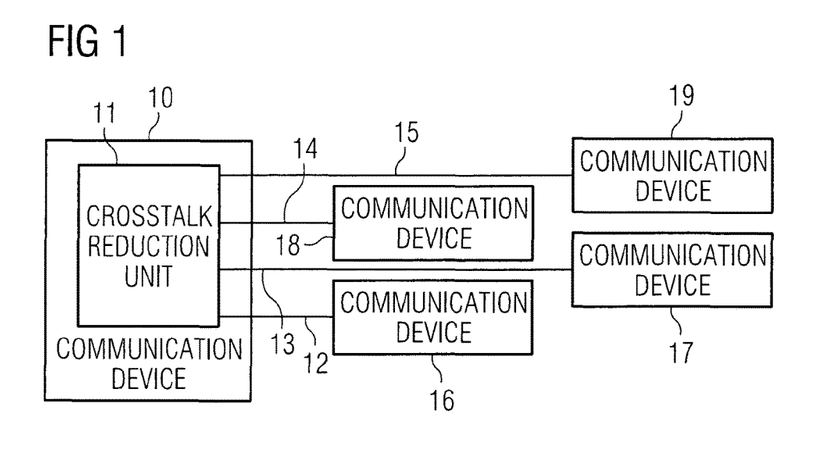
FIG. 1 is a block diagram illustrating a system according to an embodiment.

FIG. 1 illustrates an embodiment of a communication system including a communication device 10 that communicates with communication devices 16, 17, 18 and 19 via respective communication connections 12, 13, 14 and 15. While in FIG. 1 four communication devices 16, 17, 18 and 19 are shown, in other embodiments any suitable other number of communication devices may also be provided.

In an embodiment, the communication via communication connections 12, 13, 14 and 15 is a bidirectional communication. In such an embodiment, communication device 10 may comprise a transceiver for each of the communication connections 12, 13, 14 and 15, and each communication device 16, 17, 18 and 19 also may comprise a transceiver. In another embodiment, all or some of communication connections 12, 13, 14 and 15 may be unidirectional communication connections. In another embodiment, all or some of the communication devices 16, 17, 18, 19 might be co-located.

In the embodiment of FIG. 1, couplings between the communication connections 12-15 may cause crosstalk, for example if some or all of the communication connections are wire lines running close to each other. Through at least partial joint processing of the signals transmitted from communication device 10 to communication device 16, 17, 18 and 19 and through at least partial joint processing of signals received from communication devices 16, 17, 18 and 19 at communication device 10 in a crosstalk reduction unit 11, the influence of such crosstalk may be reduced. The joint processing for crosstalk reduction corresponds to the already mentioned vectoring, and the communication connections which are subjected to such a crosstalk reduction are also referred to as vectored group.

In the following, the transmission direction from communication device 10 to communication devices 16, 17, 18 and 19 will be referred to as downstream direction, and the opposite transmission direction from communication devices 16, 17, 18 and 19 to communication device 10 will be referred to as upstream direction. Reduction of crosstalk in the downstream direction is also referred to as crosstalk precompensation since the signals transmitted are modified before transmission, i.e., before the actual crosstalk occurs, whereas the reduction of crosstalk in the upstream direction is also referred to as crosstalk cancellation as here through joint processing in crosstalk reduction unit 11 the crosstalk is reduced or cancelled after it has occurred. Sometimes, the term crosstalk cancellation may also be used generically to also include precompensation.

In embodiments, crosstalk cancellation may for example be performed by calculating received signals for each communication connection depending on a linear combination of all received signals on all communication connections of the vectored group, and crosstalk precompensation may be performed by calculating signals to be transmitted via each communication connection depending on a linear combination of signals to be transmitted on all communication connections. However, other calculation methods, for example non-linear calculations, are also possible.

In order to perform this crosstalk reduction, i.e., the vectoring, the crosstalk reduction unit 11 has to be "trained", i.e., the crosstalk reduction unit 11 needs information regarding the actual crosstalk occurring between the communication connections in the vectored group for example in the form of coupling coefficients. This may for example be achieved by transmitting predetermined pilot signals for performing the training, which may also referred to as training signals, via the communication connections and analyzing the received signals to determine the crosstalk. It should be noted that these pilot signals may not only be transmitted during dedicated training phases, but also during regular data transmission. In this respect, the terms training and adapting are used synonymously herein and may be used to refer to a training for initialization purposes, for example when a communication connection joins a vectored group, a training during data transmission to account, e.g., for changes in crosstalk or both. In embodiments, data transmission via the communication connections comprises the transmission of pilot signals or symbols, wherein between the pilot signals other data like payload data may be transmitted. In an embodiment, the pilot signals or modified pilot signals are used for training crosstalk reduction unit 11. In an embodiment, synchronization signals or synchronization symbols may be used as pilot signals.

In a communication system like the one shown in FIG. 1, the situation may occur that a communication connection is to be added to the vectored group. For example, in the embodiment of FIG. 1 initially only communication connections 12, 13 and 14 may be included in the vectored group, while communication connection 15 may be inactive (for example communication device 19 may be switched off or in a low power mode) and therefore not to be added to the vectored group. When communication device 19 becomes active, in order to also reduce the crosstalk between communication connection 15 and communication connections 12-14 which already are incorporated in the vectored group, communication connection 15 is to be added to the vectored group. For such an additional communication convection to be added, crosstalk reduction unit 11 has to be trained and adapted accordingly.

In embodiments, for example during a low power mode synchronization symbols enabling crosstalk estimation are transmitted on a low power mode line. Therefore, when the line becomes active again, vectoring may be adapted immediately.

Next, with reference to FIGS. 2 and 3 devices and systems using crosstalk cancellation will be explained in more detail using a DSL system using e.g. discrete multitone modulation or another multitone approach as an example. In discrete multitone modulation data is modulated on a plurality of carriers having different frequencies, also referred to as tones. In other approaches, other modulation techniques using a plurality of carrier frequencies or tones may also be used. In yet other embodiments, other techniques may be employed.

Figure 2:
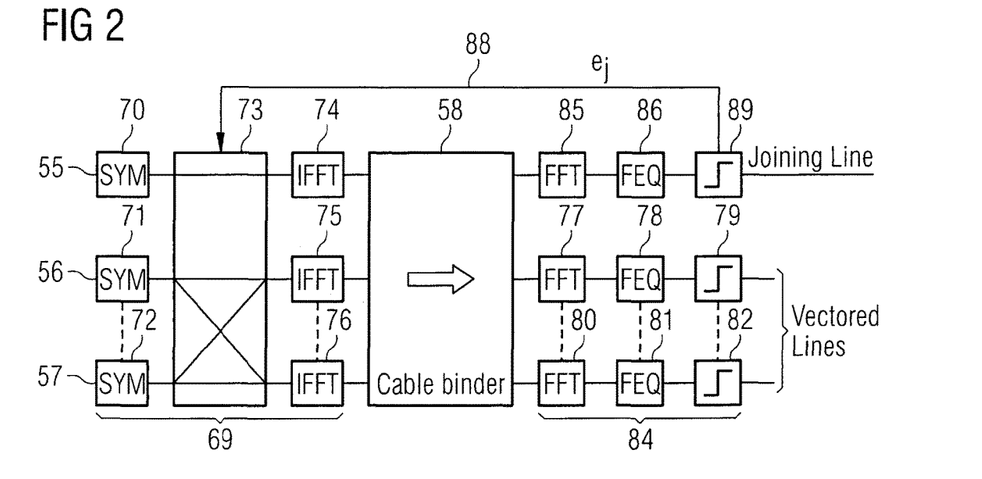
FIG. 2 is a more detailed block diagram illustrating a system according to an embodiment operating in downstream direction.
Figure 3:
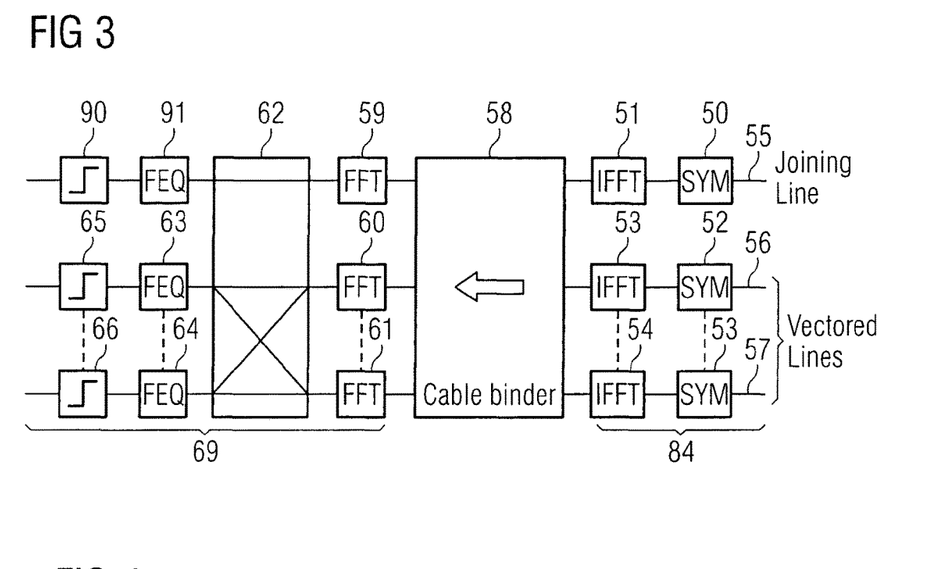
FIG. 3 is a more detailed block diagram of a system according to an embodiment operating in upstream direction.

FIG. 2 shows a DSL communication system in the downstream direction, while FIG. 3 shows a DSL communication system in the upstream direction.

In FIG. 2, a DSL communication system according to an embodiment is shown transmitting data in the downstream direction. In the system shown in FIG. 2, data is transmitted from a provider equipment 69 via a plurality of communication lines 55, 56, 57 to a plurality of receivers in customer premises generally labeled 84. Provider equipment 69 may for example comprise a cabinet as mentioned in the background section. In the system of FIG. 2, the communication lines are joined in a so-called cable binder 58. Communication lines in a cable binder are usually located comparatively close to each other and are therefore prone to crosstalk. In the system shown in FIG. 2, communication lines 56 and 57 as well as further (not shown) communication line indicated by dotted lines are already incorporated in the vectored group. It should be noted that the number of communication lines in a vectored group is not limited to any particular number. Communication line 55 in the example shown may be a line in a low power mode.

Figure 4:
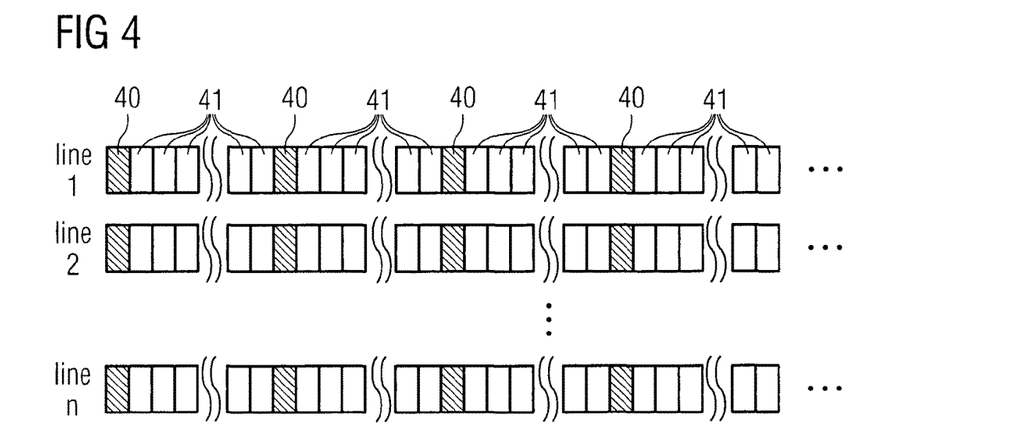
FIG. 4 is a diagram illustrating transmission of synchronization symbols and payload symbols according to some embodiments.

In the system of FIG. 4, symbol mappers denoted with reference numerals 70, 71 and 72 map data, e.g., payload or training or pilot data, onto carrier constellations which are to be transmitted via communication lines 55, 56 and 57, respectively. A crosstalk precompensator 73 modifies these symbol mappings in order to precompensate crosstalk occurring during the transmission. The such modified carrier mappings are modulated onto a plurality of carriers for each communication line, said carriers having different frequencies and being an example for a plurality of communication channels on a single communication connection, and are then transferred into signals in the time domain by inverse fast Fourier transformations 74, 75 and 76, respectively. This type of modulation, also referred to as discrete multitone modulation (DMT) is commonly used in DSL systems like VDSL systems or VDSL2 systems. In other embodiments, other techniques may be used. The such generated signals are then transmitted via the communication line to the customer premises. The received signals are then converted into the frequency domain by fast Fourier transformers 77, 80 and 85, respectively and equalized by frequency equalizers 78, 81 and 86, respectively before slicers 79, 82 and 89, respectively output received constellations which, in case of an error-free transmission, correspond to input constellations generated in 70, 71, 72 originally intended for transmission. It is to be understood that for clarity's sake only some elements of the communication devices involved are shown, and further devices like amplifiers, sampling units and the like may be present.

In embodiments, on communication line 55 during a low power mode as will be explained later in more detail synchronization signals using all tones or carriers or at least more tones or carriers than data symbols may be transmitted. These symbols may be used for crosstalk estimation during low power mode. In each of slicers 89, 79, 82 an error signal may be generated based on the synchronization signals, and fed back via a back channel 88 as signal $e_j$ for each line. Based on the error signals, channel estimation may be performed. To this end, the synchronization symbols may for example be modified by orthogonal sequences as in conventional channel estimation techniques.

It should be noted that while in FIG. 2 only a back channel for transmitting an error signal $e_j$ for the line 55 is shown, generally such back channels may be provided for all lines to obtain corresponding error signals for all lines for example for continuous adaptation of coefficients during operation or for detection of a disturber line which will be described later. The corresponding system in the upstream direction is sown in FIG. 3

In FIG. 3, some of the components for data transfer in upstream direction of the communication system already discussed with reference to FIG. 2 are shown. On the side of customer premises equipment 84, symbols 50, 52 and 53 are transmitted via the lines, symbol 50 being transmitted via the joining line 55 and symbols 52 and 53 being transmitted via the vectored lines 56, 57. Again, it should be noted that while only two vectored lines are depicted, they are intended to represent any arbitrary number of vectored lines. The symbols are modulated onto a plurality of carriers for each line corresponding to the already mentioned DMT modulation according to the VDSL2 standard used and transferred into time domain signals by inverse fast Fourier transformers 51, 53 and 54, respectively. The signals are then transmitted in the upstream direction via the respective lines 55, 56 and 57 which are in cable binder 58 to provider equipment 69. Here, the received signals are sampled and transferred to the frequency domain via fast Fourier transformers 59, 60 and 61.

A crosstalk canceller 62 is used to cancel crosstalk occurring between the lines in cable binder 58. It should be noted that crosstalk canceller 62 may fully or partially be implemented using the same circuit elements as crosstalk precompensator 73, for example by using a common digital signal processor, but also may be implemented using separate elements. Similar to what has already been described for the receiver part of customer premises equipment 84 with reference to FIG. 2, in the receiver part of provider equipment 59 shown in FIG. 3 frequency equalizers 63, 64, 91 followed by slicers 65, 66, 90 are provided to recover received symbols which in case of error free transmission correspond to symbols 52, 53, 50 originally sent.

In FIG. 3, one of the lines may be in a low power mode, indicated by a low power line. For example, in this case line 55 may be a low power line. Also in upstream direction, synchronization symbols using more tones and/or more power than other symbols like data symbols may be transmitted during low power mode to provide channel estimation. Here, errors may be determined at the receiver for crosstalk estimation, somewhat similar to conventional techniques used outside low power modes. It should be noted that low power modes in upstream and downstream direction may be independent from each other.

While in FIGS. 2 and 3 only a single low power line is illustrated, in other cases more lines may be in a low power mode, or no lines may be in a low power mode.

In other embodiments, other techniques may be used.

As already mentioned, in embodiments synchronization symbols are transmitted with more tones and/or with more power than other data symbols in a low power mode. This will be explained with reference to FIG. 4 in more detail.

In FIG. 4, for a plurality of lines (line 1, line 2, line n) an example transmission is illustrated. While line 1, line 2 and line n are shown in FIG. 4, this is not to be construed as limiting, and any number of lines or other communication connections like wireless connections may be used in embodiments.

In the example of FIG. 4, superframes are sent on each line, each superframe comprising a synchronization symbol (also referred to as sync symbol) 40 followed by a plurality of data symbols 41. The position of the synchronization symbols 40 in the example of FIG. 4 is synchronized for all the lines, i.e. they are transmitted at the same time.

To give an example, a vectored VDSL2 system as specified in ITU-T Recommendation G.993.5 transmits data by such superframes. Each superframe in this case contains one sync symbol (e.g. 40 of FIG. 4) and 256 data symbols (e.g. 41 of FIG. 4). Sync symbols may carry synchronization information, control flags (on flag-tones), and/or pilot sequences (on probe tones) that are used for channel estimation (direct channel and FEXT (far-end crosstalk) channels from and to other lines of the vectored group). To implement vectoring, data symbols and sync symbols in all lines of the vectored group are aligned in time, e.g. as illustrated in FIG. 4, i.e., all lines transmit sync symbols at the same time and data symbols at the same time in each of the transmission directions (e.g. upstream or downstream).

Since in such embodiments all sync symbols of the same transmission direction are sent synchronously, they do not disturb data transmission in other lines. Similarly, distortions generated by other lines into sync symbols also do not affect performance of the line regarding data transmission.

In vectored DSL crosstalk is cancelled, therefore changes in transmit PSD (power spectral density) in one or more lines of a vector group in certain range essentially do not cause any substantial changes in performance of other lines. However, inaccurate FEXT cancellation or no cancellation may cause a very strong drop in SNR (signal-to-noise ratio) of all lines in the vectored group. Therefore, in embodiments crosstalk in vectored systems is monitored permanently and crosstalk cancellation matrix is updated accordingly.

In some embodiments, to this end synchronization symbols are transmitted with a sufficient number of tones to perform the crosstalk estimation even when one or more lines or other communication connections are in a low power mode.

Next, low power modes according to embodiments will be discussed. In some embodiments, a low power mode is implemented as a number of different low power mode states, which may be named L2.0, L2.1, L2.2, L3 etc., to use a terminology frequently used in the context of DSL. In embodiments, each of the low power modes or also a normal operation state may be characterized by the following parameters:

range of bit rates (or the threshold bit rate to transition into the state);

quality of service requirements, such as latency and allowed probability of errors;

power reduction requirements (expectations) relative to normal operation (L0).

Other embodiments may use other parameters in addition or alternatively to the parameters listed above.

Figure 5:
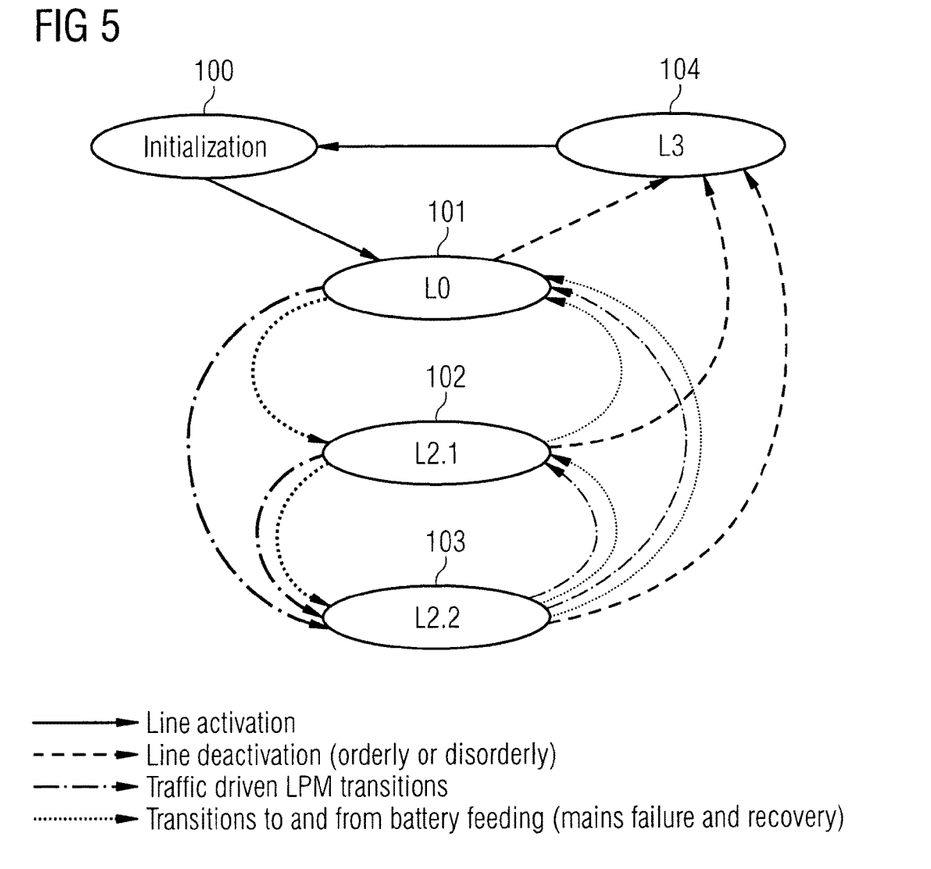
FIG. 5 is a diagram illustrating low power modes according to some embodiments.

FIG. 5 illustrates transitions from one state or mode to another, which may for example be performed in a modem or other communication device, based on traffic, i.e. incoming bit rates, data to be transmitted, and/or other circumstances, e.g. power loss like transition to battery powering e.g. in the case of mobile devices or similar. The example state diagram of FIG. 5 comprises five states, namely an initialization state 100 (sometimes also referred to as L1), a normal operation state 101 (sometimes referred to as L0), two low power mode states 102, 103 (sometimes referred to as L2.1 and L2.2) and a state 104 where the system is turned off (sometimes also referred to as L3). Arrows show transitions based on line activation, line deactivation (orderly or disorderly, a disorderly termination for example happening when the power is simply switched off), traffic-driven transitions and transitions to and from battery feeding, for example in case of mobile devices.

For example, at power on a communication device may start at initialization state 100 and then, after initialization, may proceed to normal operation 101. In case the communication device, for example a modem, detects a drop of an incoming bit rate (i.e. of an amount of data to be transmitted) below a threshold value and identifies it as sustainable (for example the low data condition remains for a predetermined period of time), or the communication device is switched to battery feeding due to power outage (for example when a mobile device is disconnected from a mains power supply, or the mains power supply fails), the system transitions to low power mode 102 or low power mode 103. For example, low power mode 103 may consume less power than low power mode 102, but may offer also smaller data transmission capabilities.

Figure 6:
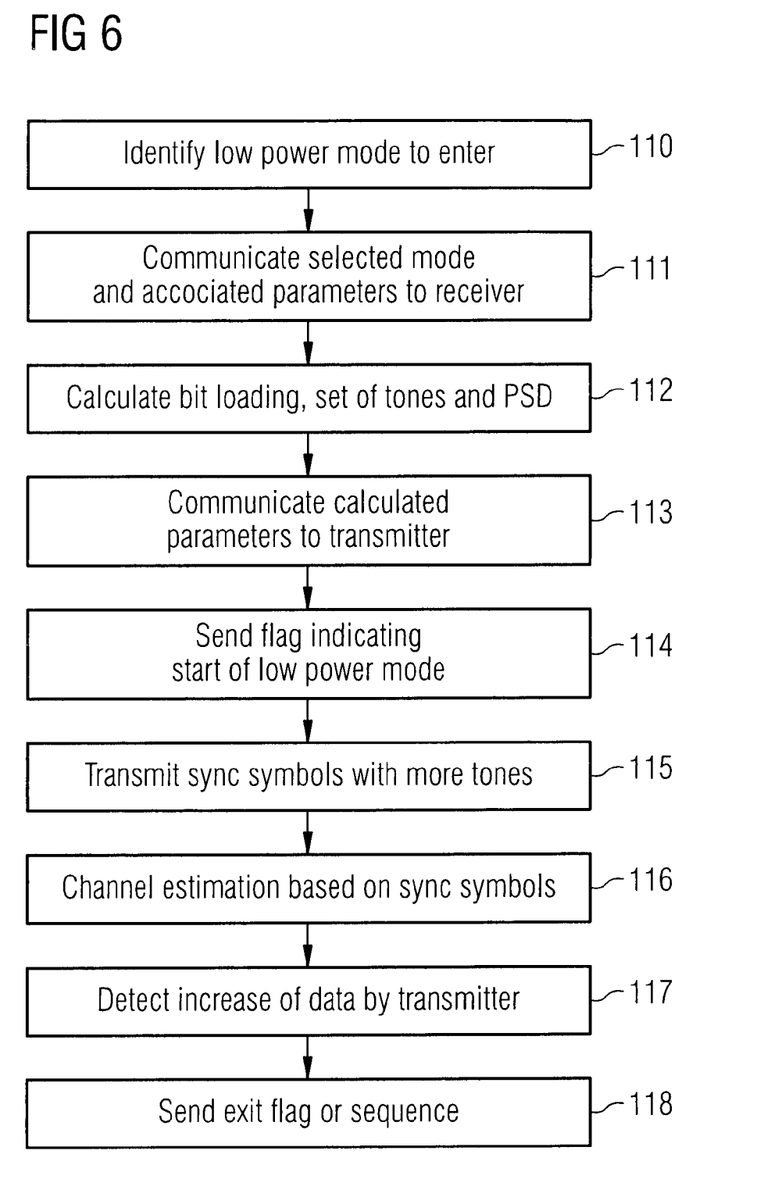
FIG. 6 is a flowchart illustrating a method according to an embodiment.

Entering low power mode, operation in low power mode and leaving low power mode will now be explained in more detail using an example embodiment with reference to FIG. 6. FIG. 6 illustrates a method according to an embodiment, which may for example be implemented in the devices or systems illustrated with respect to FIGS. 1 to 3, but may also be implemented in other communication devices or systems. While the method of FIG. 6 is illustrated and will be described as a series of acts or events, the order in which such acts or events are described is not to be construed as limiting. In particular, in other embodiments acts or events may be performed in a different order, or some acts or events may be performed concurrently with each other, for example in different parts of a circuit or in different devices. Furthermore, in other embodiments some of the acts or events described may be omitted.

In the embodiments illustrated in FIG. 6, boxes 110 to 114 relate to entering a low power mode, boxes 115 and 116 relate to operation in low power mode, and boxes 117 and 118 relate to leaving a low power mode. Features or acts relating to these different phases may also be implemented independently from each other and are illustrated within a single method in FIG. 6 only to provide a better understanding.

First, entering of a low power mode (for example boxes 110 to 114) will be described.

At 110, for example a transmitter identifies a low power mode to be entered, for example based on an amount of data to be transmitted. For example, referring back to FIG. 5 a transmitter operating in state 101 may identify one of states 102 (L2.1) or 103 (L2.2) to be entered.

At 111, the transmitter communicates the selected mode and associated parameters to a receiver. For example, the transmitter may communicate a required bit rate to the receiver. To give an example, in the system of FIG. 1 communication device 10 may be transmitter, and one of communication devices 16 to 19 may be receiver in this context, or vice versa.

At 112, the receiver may then calculate a required bit loading to provide the needed bit rate and a minimum set of tones and power spectral densities that are necessary to provide and support the selected bit rate. At 113 the receiver then communicates the parameters calculated at 112 back to the transmitter, such that the parameters are known both to transmitter and receiver. At 114, the transmitter then sends a flag or other message to the receiver which indicates a start position of the low power mode. For example, the flag may indicate an exact symbol position from which both transmitter and receiver will perform the transition into the selected power mode (for example L2.1 or L2.2, or similar, collectively referred to as L2.X) based on the parameters calculated at 112 and communicated at 113. Therefore, both transmitter and receiver may switch to low power mode at the same time. For example, a certain synchronization symbol may be used as a start of low power mode, or a certain time in case a clock common to transmitter and receiver is used, or a certain number of symbols after the flag. Other techniques may also be employed.

The acts or events described with reference to 110-114 of FIG. 6 above serve only as example, and in other embodiments variations or alterations are possible. For example, the transition to low power mode as described above in embodiments is seamless, but may take several superframes. In other embodiments, to accelerate the transitioning, the calculation of 112 may also be performed at the transmitter instead of at the receiver, such that no communication between transmitter and receiver or only one communication may be required. In some embodiments, for example the calculations of 112 may be performed at the transmitter as part of 111, and the result of the calculation may be communicated to the receiver. Therefore, in this case 113 may be omitted. This may be done for example in embodiments operating in an aggressive crosstalk environment, but is not limited thereto.

Next, operation in low power mode will be described. At 115, during low power mode synchronization symbols may be transmitted with more tones (i.e. using more tones) than data symbols. For example, synchronization symbols 40 of FIG. 4 in lines being in a low power mode may be sent with more tones and/or higher power than data symbols 41 of the respective line.

At 116, based on the synchronization symbols a channel estimation is performed. In this way, changes regarding crosstalk conditions for example may be continuously monitored, so that when normal operation is re-entered, the crosstalk cancellation from the low power line now re-entering normal mode to existing lines is essentially cancelled correctly.

This will now be described in some more details again using a DSL system as an example.

In an embodiment, in an L2 state a modem like a DSL modem may transmit both data symbols and sync symbols (see e.g. FIG. 4). Data symbols in low power mode may use only a small number of tones (also referred to as subcarriers), necessary to carry a required low bit rate. The transmit power of all tones (and PSD, accordingly) may be reduced to the minimum value necessary to support data transfer. In some embodiments, only the most reliable tones that require the minimum transmit power to carry the data may be used. For example, only tones which had highest SNR in L0 may be used in L2.X, and used with low constellation (such as 2-bit loading for each used tone). Tones will also be referred to as subcarriers herein.

In contrast to the data symbols, the sync symbols transmitted during L2 mode in embodiments may use all tones used during L0 or only a part of tones used in L0 mode, depending on the requirements for the particular L2.X mode the communication connection, e.g. link, enters, and to which mode (L2 or L0) it is supposed to return. Thus, a number of tones in sync symbol may change upon transition from one L2 state to another. Sync symbols may provide channel estimation between all lines in a binder, both to estimate a direct channel and to estimate crosstalk channel. In an embodiment, a number of tones in a sync symbol may be sufficient to:

estimate and cancel FEXT from the line into all L0 lines and other L2 lines (i.e., FEXT generated by subcarriers used by the line in its particular L2.X state for data transmission)

estimate and cancel FEXT from the lines that are in the state to which the line may be required a transition fast from its current L2.X state (e.g., L2.1 line expected to transition fast into L0 state, therefore it may use in its sync symbols all subcarriers used in L0, otherwise, prior to transition into L0, the mentioned L2.1 line would need time to estimate and cancel crosstalk from other L0 lines, which makes transition very slow).

The transmit PSD (power spectral density) of sync symbols may be also reduced for power savings. However, in some embodiments it may be beneficial to transmit sync symbols with the same PSD as in L0 state. This is because the receiver may need to measure SNR at the tones of the sync symbol to maintain and update bit loading tables that are prepared during in the L2 state to implement a quick transition into L0 or another L2.X state with higher bit rate. Using subcarriers of sync symbols as monitoring tones, in embodiments the receiver computes the bit loading and potentially other settings necessary to transition back into L0 mode or into another L2.X mentioned state in a minimum time.

Thus, in embodiments during in the L2.X state, the central office (CO) or other provider equipment tracks direct channel and FEXT channels of the line for all the subcarriers that are expected to be used in L0 or another L2.X mode the line is to transition. This information in embodiments is sufficient to compute precoder/postcoder coefficients for all subcarriers used by L2.X line (in case FEXT cancellation into the line is necessary) and for all subcarriers modem needs to transition back into L0 or another desired L2.X state.

In some embodiments, to further reduce power consumption, a communication connection (e.g. line, link etc.) could be put into sleep for some time, leaving only minimum number of symbols transmitted to support clock synchronization, vectoring, and bit loading tables for L0 state and other L2 states into which the link may need to transition. In embodiments, sync symbols may be used to support all the above-mentioned functions.

Besides sync symbols, data symbols and pilot symbols may need to be transmitted. Data symbols may e.g. carry required user information, and pilot symbols may be transmitted on dedicated time positions to provide more regular clock information to the receiver in case sync symbols and rare data symbols are insufficient in some embodiments.

In one embodiment, particular positions on which data symbols and pilot symbols will be transmitted are settled between transmitter and receiver prior transitioning into L2 mode. This may require a very intensive communication protocol between peer transceivers.

To avoid extra communications with the peer transceiver, in another embodiment the symbol positions used in a particular L2 mode may be predetermined, e.g., it may be required to use every K-th symbol in a superframe for either user data or pilot symbols. Different arrangements that are similar to the described case are also possible, such as use in every superframe first 2 symbol positions (not counting for sync symbol). In such embodiments a sync symbol is sent once per superframe, but other arrangements are also possible.

It shall be also noted that in some deployments of embodiments repetitive impulse noise (REIN) may cause severe impulse noise. The period of active symbols in such embodiments may be selected in a way that probability of coincidence of REIN and active transmission is minimized. For this, in embodiments the transmitter may also use an acknowledgement channel (called in VDSL2 RRC=Robust Retransmission Channel). Using RRC, the transmitter in an embodiment may identify a position of REIN and a REIN period and define the position of the used data symbol in L2 mode accordingly. This position may be communicated to the receiver via the operations channel, such as embedded operations channel (EOC). The default time position is determined at initialization using the feedback from the receiver.

In some embodiments, an amount of data conveyed during a particular L2 state may be so low, that it is sufficient to send data once per several superframes. In this case, one of M sync symbols (M being an integer number) may be "blanked", i.e., only subcarriers that carry flags or synchronization information are left in all active lines, while the L2 lines use the rest of sync symbol subcarriers in the selected sync symbols to transmit few keep-alive data. The sync symbols selected to be blanked are pre-defined and negotiated between communication devices (e.g. transmitter and receiver) during initialization and may be updated during showtime.

Similar functionality in some embodiments may be provided if instead of blanking some sync symbols, the system just marks them, so these sync symbols are not used for channel estimation. Pilot sequences used for channel estimation are defined accordingly, for instance repeat the corresponding bit of the pilot sequence. Further, vectoring systems that use frequency-dependent pilot sequences (FOPS), such as defined in G.993.5, may blank one or more sets of FOPS subcarriers and use those to communicate data during L2 state. In particular, in L2 mode, data may be sent using one or mode FOPS sets of probe tones, not used for channel estimation in some embodiments. This way some portion of L2 data can be send at every sync symbols and no data symbols are needed. For instance, in G.993.5, FOPS tones have a periodicity of 10 and up to 8 probe sequences can be assigned. If only 4 FOPS groups are needed, other 4 groups may be used for L2 data in some embodiments. If 2000 tones are used per direction, one FOPS group includes 200 tones, and 4 groups include 800 tones accordingly. With QPSK (Quadrature Phase Shift Keying) bit loading used in sync symbols, this can carry 1600 bits=200 bytes of data per every 64 ms, which is much more than usually required for "keep alive" L2 service, which is about 1 packet per second.

The above-references to G.993.5 and examples associated therewith serve merely illustrative examples, and techniques disclosed herein may also be applied to other types of communication systems.

Returning now to FIG. 6, at 117 the transmitter detects an increase in an amount of data to be transmitted. Depending on the detected increase, the transmitter may determine to which state or mode a transmission should be made. For example, in the case illustrated in FIG. 5 a change may be made to normal operation (101) or to a low power mode supporting a higher bit rate (for example from 103 to 102). At 118, the transmitter then sends an exit flag or exit sequence to the receiver indicating the change of modes. The exit flag or sequence may be a robust signal indicating the exact symbol position (similar to the flag at 114) from which both transmitter and receiver will transition into the new state (for example L0 state 101 or a selected L2 mode like 102 with a bit rate that exceeds the bit rate in the current low power mode.

Figure 7:
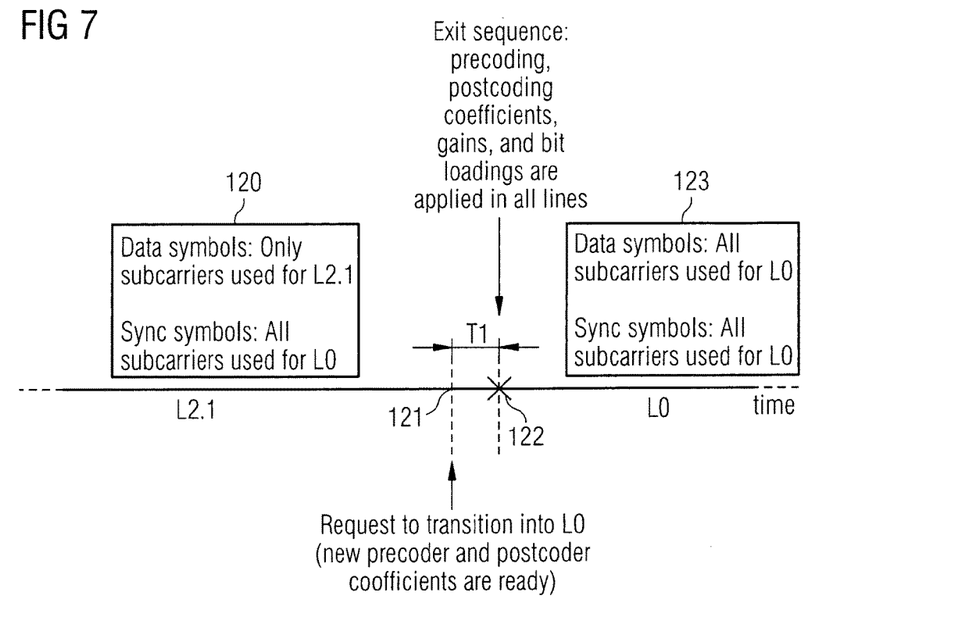
FIG. 7 is a diagram illustrating exiting a low power mode according to an embodiment.

An example for such a scheme for leaving a low power mode is illustrated in FIG. 7. A box 120 indicates the low power mode, for example L2.1. As indicated by box 120, for example in the low power mode only some subcarriers or tones may be used for data symbols, while for synchronization symbols all subcarriers or tones also used in L0 (101 in FIG. 5) may be used.

At 121, the request (for example exit flag of 118 of FIG. 6) is sent. After a time T1, the transition takes place. Then, after the transition for example to L0 as indicated by a box 123 all subcarriers or tones are used both for data symbols and for synchronization symbols.

In this case, the time for the transition T1 is rather small because both transmitter and receiver have the relevant bit loading tables ready (they may be continuously exchanged, for example as explained with respect to 111 and 112, also for normal operation), and far-end crosstalk is evaluated and canceled on all tones that are active in the new state, as in embodiments synchronization symbols transmitted during the low power state as indicated by a box 120 and as explained previously may include all tones or subcarriers that are acting in the new state, for example L0 state. Therefore, during the low power state both bit loading and precoder coefficients for vectoring may be permanently updated for all subcarriers which later are active in the new state, for example L0 state.

In other embodiments, there may be no need for such a fast transition, and in this case also synchronization symbols during at least most of the low power state may only use subcarriers needed for data transfer in this case. Exiting a low power mode according to such an alternative embodiment is illustrated in FIG. 8.

Figure 8:
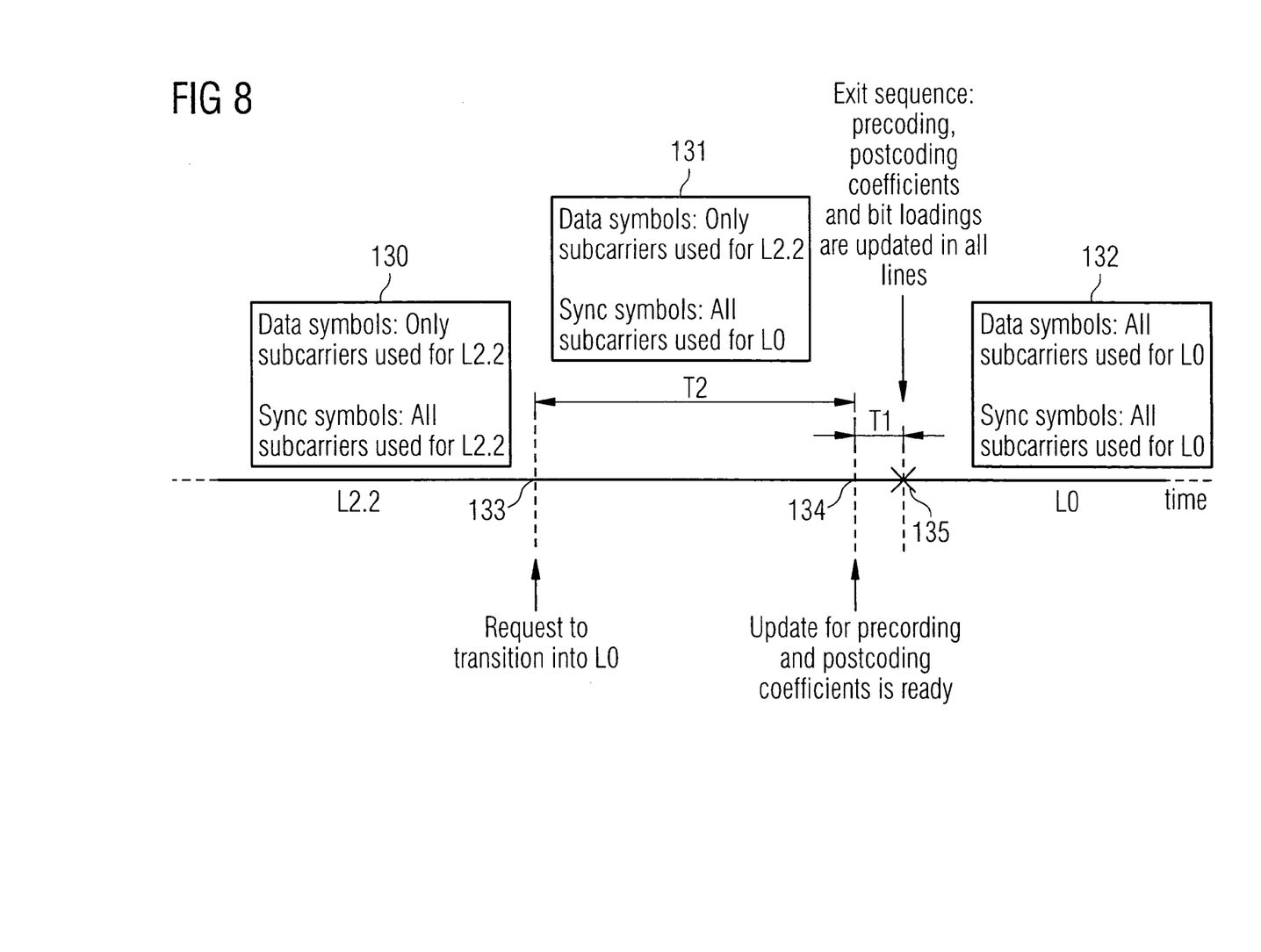
FIG. 8 is a diagram illustrating exiting of a low power mode according to another embodiment.

In FIG. 8, to give an example a transition from L2.2 (state 103 of FIG. 5) to state L0 (state 101 of FIG. 5) is illustrated. As indicated by a box 130, in this example in the low power state data symbols use only subcarriers or tones necessary for the low power state, and synchronization symbols in some cases may also use only these subcarriers. In other embodiments, the synchronization symbols may use more subcarriers or tones than data symbols.

At 135, for example the transmitter requests a transition to L0 or any other state requiring a higher bit rate. Then, during a transition time T2, as indicated by a block 131 all subcarriers that are used for the state to be transitioned to (for example L0) are used for synchronization symbols. This situation corresponds essentially to the situation in the low power mode as indicated by box 120 in FIG. 7 at least as regards the synchronization symbols. During time T2, using the synchronization symbols channel estimation, signal-to-noise ratio estimation, computation of precoder coefficients and bit loading on subcarriers that are not used in the low power mode (for example L2.2 in the example of FIG. 8) are calculated. After that time, which ends at 134, the coefficients are updated, and essentially the same exit sequence as in the case of FIG. 7 may commence lasting a time T1 up to a time 135. For many applications, the time T2 may be too long. However, for applications where the time T2 is acceptable, the approach of FIG. 8 where synchronization symbols use more tone or subcarriers only during a time T2 at the end of the low power mode may contribute to some additional power saving due to the reduced number of tones or subcarriers in the low power mode.

Other approaches may also be used.

The embodiments described above serve only as examples and are not to be construed as limiting. In particular, in other embodiments other approaches may be used.

Moreover, techniques disclosed herein, while suitable for vectored systems, may also be used for non-vectored systems.

For example, for non-vectored VDSL2 systems principles as described above may be applied: when in L2 state, data symbols are transmitted with a small set of active subcarriers needed to convey low-speed data rates during L2, while sync symbols are transmitted with more subcarriers, with an intention to use these subcarriers for monitoring to update the bit loading tables associated with L0 state or other L2 state with higher bit rate to which the line may need to transition (fast transition).

In some embodiments the transmit PSD of sync symbols may be kept high, as in L0 mode. This may improve the accuracy of monitoring for bit loading updates. However, since sync symbols may not be aligned in (non-vectored) different VDSL2 lines, they may cause a repetitive noise into other lines (in L0 or L2 mode). This repetitive noise will not cause performance damages to existing lines in some circumstances, since their bit loading is set prior transition to L2, but new lines may not be aware and suffer.

The following measures can be employed in embodiments to mitigate the issue:
  use PSD reduction (full or partial) also on sync symbols; for example, if sync symbols are reduced in PSD sane as other data symbols no non-stationary noise is created;
  analyze presence of repetitive noise (with a known period of VDSL2 superframe) during initialization and showtime, and use the measurements to keep SNR margin and bit loading respectively;
  inform new-coming lines on the presence of lines in L2 mode during the initialization and adjust the value of the virtual noise accordingly;
  in case of multiple DSLAMs (Digital Subscriber Line Access Multiplexers) serving the cable binder, use a remote network management systems to inform each of the DSLAMs on the presence of L2 lines in the binder, their specific L2 state, and the amount. This will allow each DSLAM to define the virtual noise during initialization accordingly. The DSLAM shall pass this information to the CPEs during initialization using available communication channels (e.g., G,994.1 handshake or Special Operations Channel (SOC) defined in G.993.2).

The above measures may be used individually, or two or more of these measures may be combined in some embodiments.

The term "virtual noise" as used above may have the same meaning as for example defined in ITU-T Recommendation G.993.2, for example Revision 2011.

Other techniques may also be employed in other embodiments. Methods and techniques disclosed herein may be implemented as software, hardware, firmware or combinations thereof. For example, some of the techniques may be implemented in firmware, hardware or software in the communication devices discussed with reference to FIGS. 1 to 3. Some or all of the techniques may be implemented by storing instructions in a non-transitory storage medium and providing a processor coupled to the storage executing the instructions. Hardware implementations are equally possible.

The invention claimed is:

1. A communication device, comprising:
   a transmitter,
   the communication device being configured to identify a low power mode for association with the transmitter and an associated receiver, wherein the transmitter is adapted to communicate the low power mode,
the communication device further being configured to provide a bit loading and tone associated information,
the transmitter further being configured to communicate a flag that indicates a symbol position, the symbol position to indicate when the low power mode will commence,
wherein the transmitter is configured to transmit synchronization symbols during low power mode which use more tones than data symbols when being transmitted at least at the end of the low power mode; wherein the device is adapted to perform channel estimation based on an error signal that is based on the synchronization symbols,
wherein the transmitter is further configured to transmit the synchronization symbols during the low power mode with more power than the data symbols.

2. The device of claim 1, wherein the transmitter is adapted to transmit the synchronization symbols having the more tones than data symbols when being transmitted during a complete low power mode.

3. The device of claim 1, wherein the synchronization symbols during at least the end of the low power mode use all tones to be used in a mode to be entered after the low power mode.

4. The device of claim 1, wherein the device is adapted to blank a part of the synchronization symbols.

5. The device of claim 1, wherein the device further comprises a receiver circuit, wherein the providing the bit loading and tone associated information comprises receiving the bit loading and tone associated information by the receiver circuit.

6. The device of claim 1, wherein the device is adapted to employ vectoring.

7. The device of claim 1, wherein the device is adapted to communicate an end of the low power mode depending on an amount of data to be transmitted.

8. The device of claim 1, wherein the device is adapted to adjust a position of symbols used for channel estimation during low power mode based on detected repetitive electrical impulse noise.

9. A communication method, comprising:
identifying a low power mode for association with a transmitter and an associated receiver,
communicating the low power mode,
providing a bit loading and tone associated information, and
communicating a flag that indicates a symbol position, the symbol position to indicate when the low power mode will commence,
transmitting synchronization symbols during low power mode which use more tones than data symbols when being transmitted at least at the end of the low power mode;
wherein the device is adapted to perform channel estimation based on an error signal that is based on the synchronization symbols,
wherein the transmitter is further configured to transmit the synchronization symbols during the low power mode with more power than the data symbols.

10. The method of claim 9, further comprising transmitting the synchronization symbols having the more tones than data symbols when being transmitted during a complete low power mode.

11. The method of claim 9, wherein the synchronization symbols during at least the end of the low power mode use all tones to be used in a mode to be entered after the low power mode.

12. The method of claim 9, further comprising providing the bit loading and tone associated information comprises receiving the bit loading and tone associated information from a receiver device.

13. The method of claim 9, further comprising adjusting a position of symbols used for channel estimation based on detected repetitive electrical impulse noise.

14. The method of claim 9, further comprising communicating an end of the low power mode depending on an amount of data to be transmitted.

15. A device, comprising:
a transmitter, the transmitter being adapted to transmit synchronization symbols and data symbols,
wherein the device is operable in a regular mode and in at least one low power mode,
wherein, in the low power mode, the device is adapted to use more tones for transmission of synchronization symbols than for transmission of data symbols when being transmitted at least at the end of the low power mode; wherein the device is adapted to perform channel estimation based on an error signal that is based on the synchronization symbols,
wherein the transmitter is further configured to transmit the synchronization symbols during the low power mode with more power than the data symbols.

16. The device of claim 15, wherein the device is adapted to use the same number of tones for the synchronization symbols in the low power mode and in the regular mode.

17. The device of claim 1, wherein the transmitter is configured to transmit the synchronization symbols using all tones used during a normal mode.

* * * * *